United States Patent

[11] 3,612,632

[72] Inventor George V. Woodling
         22077 W. Lake Road, Rocky River, Ohio
         44116
[21] Appl. No. 878,745
[22] Filed Nov., 1969
[45] Patented Oct. 12, 1971

[54] SPLIT-BORE MOUNTING FOR BEARING MEANS
     8 Claims, 4 Drawing Figs.

[52] U.S. Cl. .................................................. 308/207
[51] Int. Cl. ............................................... F16c 35/06
[50] Field of Search ........................................ 308/236,
                                                                207

[56] References Cited
           UNITED STATES PATENTS
2,114,976  4/1938   Eastburg ...................... 308/236
2,540,997  2/1951   Schmitter ..................... 308/207
2,955,884  10/1960  Marshall ....................... 301/63

3,429,224  6/1966   Osburn ......................... 308/189
3,455,617  7/1969   Woodling ..................... 308/207
           FOREIGN PATENTS
  841,538  2/1939   France ......................... 308/207

Primary Examiner—Martin P. Schwadron
Assistant Examiner—Frank Susko
Attorney—Woodling, Krost, Granger and Rust ABSTRACT: A tapered roller bearing unit is split mounted in confronting bores provided in a pair of connected body members. The tapered roller bearing unit includes an outer cup mounted in split-bores confronting each other and adapted to make a close fitting relationship therewith. The close fitting relationship holds the split confronting bores in substantially straight axial alignment with each other, and in addition thereto, provides a fluid seal between the connected body members. Axial fixation means is provided to accommodate for the axial position of the bearing unit in the split-bores.

PATENTED OCT 12 1971 3,612,632

INVENTOR.
GEORGE V. WOODLING
BY
Woodling, Krost, Granger and Rust
attys.

SPLIT-BORE MOUNTING FOR BEARING MEANS

BACKGROUND OF THE INVENTION

A tapered roller bearing unit includes an outer cup adapted to be mounted in a bore. The cup is fixedly held against axial movement in one direction within the bore, usually by an internal shoulder in the bore or by a spacer ring. However, difficulty is encountered in holding the cup against axial movement in the opposite direction. Attempts have been made to hold the cup against this opposite movement by "boxing" the cup in the bore with a bolt-connected flange, hoping that the flange would "hit" the cup at the same instant that the flange "hits-home" upon being tightened by the bolts. The "boxing" is a hit or miss proposition, and cannot be relied upon, because of the difficulty in matching axial machine tolerances to accommodate for both the bearing and the flange. If the cup is allowed to move only a small amount in an axial direction, less than a thousandth of an inch or two, the true bearing relationship is disturbed by reason of the tapered design of the bearings. U.S. Pat. No. 3,455,617 shows a construction to hold the bearing against axial movement, except that the arrangement is awkward, requiring a long axial and annular extension to reach the outer face of the cup which is axially recessed from the outer face of the inner cone upon which the tapered roller bearings roll. The long extension makes the distance between the bearing and the center of the output shaft extra long and thereby increases the radial thrust on the bearing. Also, an O-ring is required in U.S. Pat. No. 3,455,617 to provide a fluid seal for the flange.

Accordingly, it is an object of the present invention to provide a split-bore mounting for the outer cup of a tapered roller bearing unit to accommodate for a foreshortened output shaft.

Another object is to "split-mount" the outer cup in the confronting bores with a close fitting relationship therebetween, whereby the cup holds the confronting bores in substantially straight axial alignment with each other, as well as provides a fluid seal.

Another object is to obviate the need for a long axial member extending from the flange to reach the "recessed" outer face of the cup.

Another object is to reduce the axial length between the outer cup and the center of the output shaft.

Another object is to provide for mounting an axial fixation means within the bore of the flange.

Another object is the provision of axial fixation means which is capable of resisting an axial thrust thereagainst greater than the endwise thrust to which the bearing means may be subjected in operation.

SUMMARY OF THE INVENTION

The invention constitutes a split-bore mounting for bearing means, wherein said mounting includes first body means having first transversely disposed wall means and first bore means extending from said first wall means in a first axial direction, second body means having second transversely disposed wall means and second bore means extending from said second wall means in a second axial direction opposite from said first axial direction, said bearing means including an annular bearing member having substantially a cylindrical external surface, said external surface of said annular bearing member having a first annular portion mounted within said first bore means and making a close fitting relationship therewith and having a second annular portion mounted within said second bore means and making a close fitting relationship therewith, and connection means to hold said first and second body means together with said close fitting relationship holding said first and second bore means in substantially straight axial alignment with each other.

Other objects and a fuller understanding of this invention may be had by referring to the following description and claims, taken in conjunction with the accompanying drawings, in which:

For clarity of invention, the usual seal for the rotating shaft is not shown. Also, all wear parts are made of hardenable surfaces and are well lubricated by the operating fluid.

Figure 1:
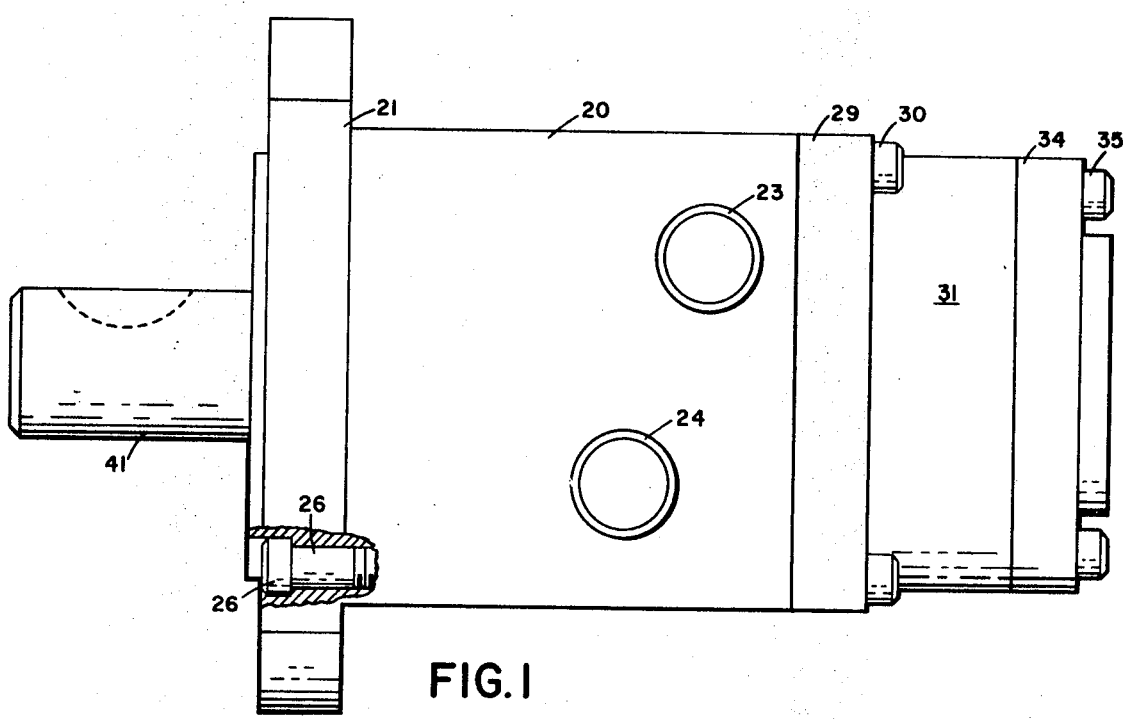
FIG. 1 is a top view of a fluid pressure device, embodying the features of my split-bore mounting for bearing means.

With reference to the drawing, the fluid pressure device in which my split-bore mounting for bearing means may be incorporated, comprises generally a main housing 20 having substantially a square cross section. A mounting flange 21 may be secured to the left-hand end of the housing by means of suitable screws 26 (one of which is shown in Figure 1). The housing 20 is hollow from end-to-end, and intermediate the ends of the hollow housing there is provided an annular internal rim 22 which generally separates the hollow housing into a left-hand end compartment and a right-hand end compartment. Rotatively mounted in the left-hand end compartment is a main shaft 25 having an axis substantially coinciding with the longitudinal axis of the fluid pressure device. A bushing 27 and a rotary valve 28 (partly shown in FIG. 2) are mounted in the right-hand end compartment. On the right-hand end of the hollow housing, there is mounted a square stationary valve member 29 by means of suitable screws 30. The rotary valve is adapted to be rotated relative to the stationary valve member 29 for controlling the entrance of fluid to and the exit of fluid from a stator-rotor mechanism 31. An end cap 34 encloses the stator-rotor mechanism 31. The stator-rotor mechanism 31 and the end cap 34 are secured to the stationary valve member 29 by means of screws 35. Fluid is delivered to and from the housing 20 through a pair of fluid ports 23 and 24. An actuating shaft 36 interconnects the main shaft 25 with the stator-rotor mechanism 31 and is adapted to transmit torque therebetween.

The main shaft 25 comprises an enlarged internal portion having a reduced external portion 41 extending axially outwardly of the main housing 20 through the mounting flange 21. The enlarged internal portion of the main shaft is supported preferably by tapered roller bearings 42 and 43, respectively, having inner cones 44 and 45 and outer cups 46 and 47. The tapered roller bearings are disposed side-by-side with the bearing 42 disposed oppositely to that of the tapered roller bearing 43. Thus, the tapered roller bearings 42 and 43, in combination with each other, provide for radial thrust as well as for end thrust in both axial directions, with the tapered roller bearing 42 disposed to take the greater part of the radial load. The enlarged internal portion of the main shaft 25 is provided with a first portion 50 upon which the inner cone 45 is pressed and a second portion 51 upon which the inner cone 44 is pressed. The portion 51 terminates into a shoulder 52 against which the left-hand end of the inner cone 44 abuts. The two inner ends of the cones 44 and 45 are separated by a shaft spacer ring 53. Mounted against the right-hand end of the inner cone 45 is a tightening nut 54 which threadably engages male threads 55 provided on the shaft. Upon tightening the nut 54, the two cones 44 and 45 with the shaft spacer ring 53 therebetween are secured against axial movement upon the main shaft. The tightening nut 54 may be provided with a built-in locking feature to prevent loosening.

Figure 2:
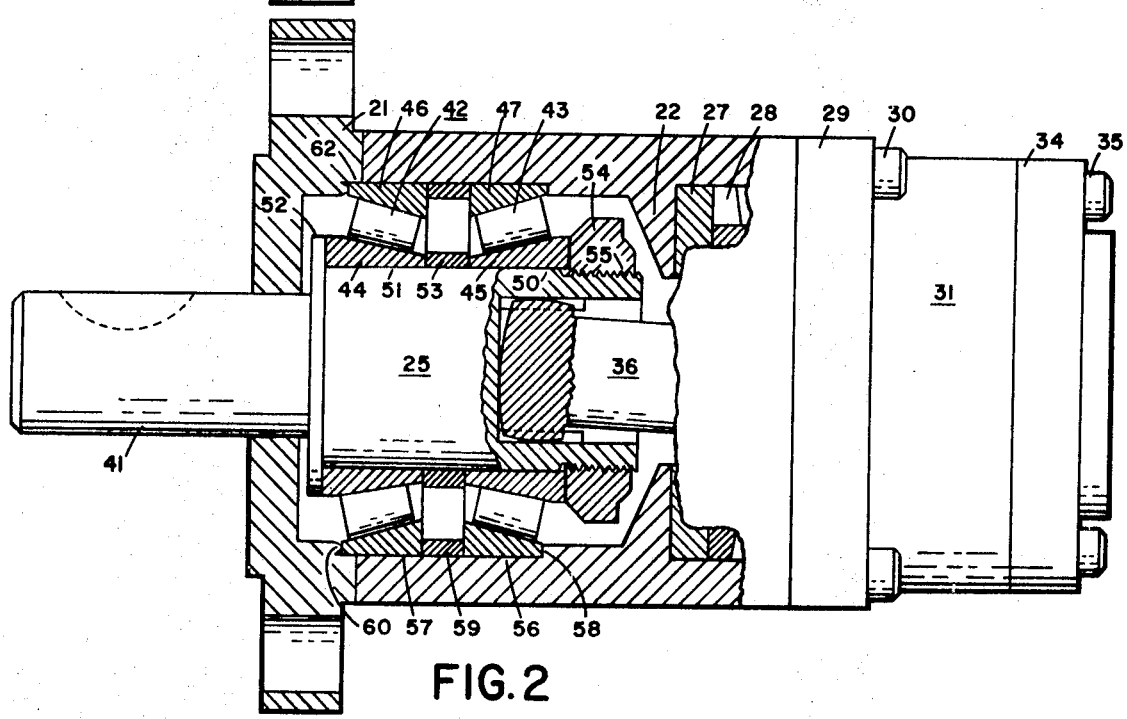
FIG. 2 is a partial longitudinal sectional view of FIG. 1, showing principally the construction of my split-bore mounting for bearing means.
Figure 3:
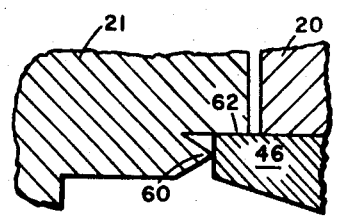
FIG. 3 is an enlarged fragmentary cross-sectional view of the bearing fixation means in FIG. 2 to accommodate for machine tolerances in matching the axial position of the bearing, the view showing the position of the parts before engagement of the fixation means.
Figure 4:
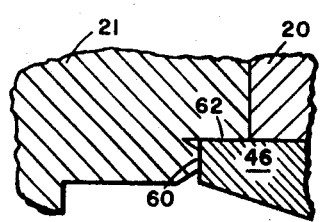
FIG. 4 is a view similar to FIG. 3, but showing the position of the parts after engagement of the fixation means.

The internal surface of the left-hand end compartment of the hollow housing 20 is provided with a first bore portion 56 into which the outer cup 47 is pressed and a second bore portion 57 into which the outer cup 46 is pressed. The bore portion 56 terminates into a shoulder 58 against which the right-hand end of outer cup 47 abuts. The two inner ends of the cups 46 and 47 are separated by a bore spacer ring 59. As illustrated in FIGS. 2, 3 and 4, the flange 21 is provided with a bore 62 confronting the bore in the housing 20. The left-hand annular portion of the cup 46 projects beyond the end of the housing 20 and extends into the bore 62 of the flange 21. Thus, a right-hand annular portion of the cup 46 is mounted in the bore of the housing 20 and a left-hand annular portion of the cup 46 is mounted in the bore of the flange 21. This construction provides for a split-bore mounting of the cup. The cup 46 makes a close fitting relationship (press-fit) with both of the bores in the flange and in the housing and holds the two confronting bores in substantially straight axial alignment with each other, as well as, provides a fluid seal between the flange and the housing. The left-hand annular portion of the cup 46 extends into the flange bore 62 for only a relatively short distance, whereby the flange 21 may be readily dismantled from the housing 20 upon removing the screws 26.

As shown, the outer cup 46 is secured against axial movement to the left by axial fixation means, indicated by the reference character 60. The axial fixation means 60 is located within the bore 62 of the flange and comprises an annular V-shaped or pointed rib which axially abuts against a transversely disposed solid abutment wall of the outer cup 46. The rib may be constructed either integrally with or as a separate part from the flange 21. By pressing the flange 21 against the end of the housing 20 during assembly, the pointed rib is coined against the outer cup 46, with the result that the fixation means accommodates for axial tolerance in matching the position of the cup 46 in the split-bores. The pressure required to coin the axial fixation means is greater than the endwise thrust load to which the bearing means 42 may be subjected in operation, in which case the outer cup 46 is resisted against axial movement to the left. In assembly, the axial fixation means is axially fixable (coinable) and is disposed to resist an axial thrust load greater than the endwise thrust to which the bearing means 42 may be subjected in operation. The FIG. 3 shows the axial fixation means 60 before it is coined or fixed and the FIG. 4 shows the axial fixation means after it has been coined. The main shaft is entirely supported by the two tapered roller bearings 42 and 43. The reduced external shaft portion 41 where it passes axially through the end mounting flange 21 is not journaled therein but rotates therein with a small radial clearance which is adapted to be sealed off by suitable shaft seal means, not shown. The tapered roller bearing assembly is claimed to be new and novel to the extent that the respective inner cones and the respective outer cups are spaced apart by spacer rings, with the inner cones held against axial movement on the shaft by a tightening nut and with the outer cups held against axial movement in the housing by axial fixation means. With my bearing assembly, the external shaft portion 41 is disposed to withstand a heavy load. The overall construction, makes it possible to reduce the length between the bearing means 42 and the center of the output shaft 41, with the result that the output shaft may withstand a heavier side load without imposing a heavier side thrust on the bearing 42. The axial fixation means 60, after being coined, provides a fluid seal between the housing and the flange.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A split-bore mounting for bearing means, said mounting comprising first body means having first transversely disposed wall means and first bore means extending from said first wall means in a first axial direction, second body means having second transversely disposed wall means and second bore means extending from said second wall means in a second axial direction opposite from said first axial direction, bearing means including an annular bearing member having substantially a cylindrical external surface, said external surface of said annular bearing member having a first annular portion mounted within said first bore means and making a close fitting relationship therewith and having a second annular portion mounted within said second bore means and making a close fitting relationship therewith, connection means to hold said first and second body means together with said close fitting relationship holding said first and second bore means in substantially straight axial alignment with each other, load shaft means rotatably supported by said bearing means, said load shaft means having an enlarged shaft portion and a reduced shaft portion with substantially a common axis, said enlarged shaft portion having first and second end body portions, said second end body portion having shaft shoulder means thereon, said reduced shaft portion extending in an axial direction from said shaft shoulder means, said shaft shoulder means including bearing stop means against which said bearing means may axially abuts, said first end body portion comprising hollow body means having an external substantially cylindrical surface and an internal substantially cylindrical surface, said internal surface having female spline teeth therein, said external surface having shaft male threads thereon, threadable means engaging said shaft male threads and axially pressing said bearing means against said bearing stop means for securing said bearing means on said enlarged shaft portion against axial movement, actuating shaft means having at least a connection portion, said connection portion having male spline teeth thereon and fitting within said female spline teeth for transmitting torque therebetween, said second body means having recess wall means extending from said second transversely disposed wall means and including said second bore means, said recess wall means terminating in a transversely disposed terminal wall having a shaft bore extending therethrough, said reduced shaft portion extending through said shaft bore for external connection to a load, said shaft shoulder means confronting said terminal wall and disposed within said recess wall means.

2. The structure of claim 1, wherein said close fitting relationship provides a fluid seal between said first and second body means.

3. The structure of claim 1, wherein said annular bearing member is secured in said bore means against movement in said first axial direction and has a transversely disposed solid abutment wall facing in said second axial direction, coinable increasing area means constituting axial fixation means confronting and abutting against said solid abutment wall and securing said annular bearing member against movement in said second axial direction to accommodate for tolerance in matching the axial position of said annular bearing member in said bore means.

4. The structure of claim 3, wherein said axial fixation means comprises an integral part of said second body means.

5. The structure of claim 3, wherein said axial fixation means is mounted within said second bore means.

6. The structure of claim 3, wherein said bearing means includes tapered roller bearings and wherein said annular bearing member comprises a cup for said tapered roller bearings.

7. The structure of claim 5, wherein said axial fixation means is capable of resisting an axial thrust thereagainst greater than the endwise thrust to which the bearing means may be subjected in operation.

8. In a housing having first bore means, flange means having second bore means, radial thrust means to hold said flange means and said housing against radial movement relative to each other whereby said bore means are held in substantially axial alignment with each other, a shaft, said shaft having an enlarged portion and a reduced portion with substantially a common axis, said enlarged portion having first and second end body portions, said second end body portion terminating in shaft shoulder means and said reduced portion extending in an axial direction from said shaft shoulder means, said enlarged portion of said shaft being mounted within and radially spaced from said bore means, at least first and second tapered roller bearing means mounted between said enlarged portion of said shaft and said bore means, said at least first and second tapered roller bearing means being mounted side-by-side with respect to each other, said first tapered roller bearing means including a first cone and a first cup, said first cone being mounted on said first end body portion, said first cup being mounted in said first bore means, said second tapered roller bearing means including a second cone and a second cup, said second cone being mounted on said second end body portion, said second cup constituting said radial thrust means, shaft spacer means separating said cones on said enlarged portion of said shaft, bore spacer means separating said cups, said shaft shoulder means constituting stop means against which said second cone axially abuts, connection means threadably engaging said first end body means and axially pressing against said first cone and securing said cones with the shaft spacer therebetween on said enlarged portion of said shaft against axial movement, bore shoulder means in said first bore means against which said first cup axially abuts, coinable increasing area means constituting axial fixation means abutting said second cup and securing said cups with the bore spacer means therebetween against axial movement to accommodate for tolerance in matching the axial position of said second cup, said flange means having a recess bore extending in an axial direction from said axial fixation means, said recess bore having a transversely disposed terminal wall with a shaft bore extending therethrough, said reduced portion of said shaft extending through said shaft bore, said shaft shoulder means confronting said terminal wall and disposed within said recess bore.